United States Patent [19]

Chen

[11] Patent Number: 5,405,703
[45] Date of Patent: Apr. 11, 1995

[54] ADHESIVE COMPOSITION, METHOD FOR MAKING SAME AND TAPES INCLUDING SAME

[75] Inventor: Samuel J. Chen, Lexington, Mass.

[73] Assignee: The Kendall Company, Mansfield, Mass.

[21] Appl. No.: 250,875

[22] Filed: May 31, 1994

Related U.S. Application Data

[63] Continuation-in-part of Ser. No. 898,606, Jun. 15, 1992, abandoned, and a continuation of Ser. No. 548,806, Jul. 5, 1990, abandoned, which is a continuation-in-part of Ser. No. 456,717, Dec. 26, 1989, abandoned.

[51] Int. Cl.$^6$ ............................................. B32B 15/08
[52] U.S. Cl. ................................. 428/461; 525/330.2; 428/343; 428/344; 428/463
[58] Field of Search ............... 428/461, 343, 344, 463; 525/330.2

[56] References Cited

U.S. PATENT DOCUMENTS

| | | | |
|---|---|---|---|
| 4,454,379 | 6/1984 | Cleveland et al. | 174/607 |
| 4,880,880 | 11/1989 | Chen | 525/163 |
| 4,900,624 | 2/1990 | Chen | 428/463 |
| 4,902,569 | 2/1990 | Chen | 428/461 |
| 4,997,709 | 3/1991 | Huddlestar et al. | 428/462 |
| 5,095,071 | 3/1992 | Chen | 525/163 |
| 5,104,701 | 4/1992 | Cohen et al. | 428/40 |

*Primary Examiner*—Bernard Lipman
*Attorney, Agent, or Firm*—Alvin Isaacs

[57] ABSTRACT

Disclosed are improved metal foil tapes meeting Underwriter Laboratories (UL) requirements and specifications for use with rigid fiberglass air ducts, the tapes having a pressure-sensitive adhesive layer consisting essentially of the crosslinked copolymer of operative amounts of: (1) ethylenically unsaturated carboxylic acid containing 3-6 carbon atoms within the range of 2-15 parts by weight of total polymer; and (2) acrylic and/or methacrylic acid ester of a non-tertiary alcohol having 1-14 carbon atoms within the range of 85-98 parts by weight of total polymer.

4 Claims, No Drawings

ADHESIVE COMPOSITION, METHOD FOR MAKING SAME AND TAPES INCLUDING SAME

RELATED APPLICATIONS

This application is a continuation-in-part of Ser. No. 07/898,606, filed Jun. 15, 1992 (now abandoned), as a continuation of Ser. No. 07/548,806, filed Jul. 3, 1990 (now abandoned) which in turn is a continuation-in-part of Ser. No. 07/456,717, filed Dec. 26, 1989, and now abandoned.

BACKGROUND OF THE INVENTION

The present invention relates to novel adhesives and, more particularly, to novel adhesives which can be coated onto an aluminum backing material to provide so-called foil tapes which meet the very severe Underwriter Laboratories, Inc. (UL) 181A requirements and specifications for use with rigid fiberglass air ducts.

Foil tapes, e.g. pressure-sensitive or heat-bonded aluminum tapes are of course known in the art. It is also heretofore known to employ foil tapes for such purposes as closure systems for use with factory-made air ducts and connectors. However, recently UL has imposed very severe standards for this usage. Consequently, the primary task of this invention can be said to develop an improved aluminum (foil) tape which will meet the recent UL requirements and specifications, as detailed hereinafter, for the aforementioned usage.

U.L. SPECIFICATIONS

Peel Adhesion

Three samples from each of three separate rolls of tape cut in 1 inch (25.4 mm) wide by 12 inches (305 mm) long strips are to be tested. The tape samples are to be applied (as specified in ASTM D-3330-83) to a stainless steel panel with a mechanically operated roller weighing 10 pounds (4.53 kg.). The roller is to pass over each sample five times in each direction. The test load is to be applied 15 minutes after completion of the rolling.

Test No. 1

The average peel adhesion strength of each roll of aluminum tape shall be $\geq 3.75$ lbs. (60 oz) per inch of width (0.66 N/mm) of tape, with no individual sample having a value $\leq 3.20$ lbs (51.2 oz) per inch of width (0.56 N/mm).

Shear Adhesion

The shear adhesion strength of aluminum tape is to be determined in accordance with ASTM D-3654-82, as modified in the following description. One sample from each of four separate rolls are to be tested. Samples are to be cut in 1-inch (25.4 mm) wide by 6-inch (152 mm) long strips. The cut samples and specified stainless steel panels are to be maintained at the specified application conditions a minimum of one hour prior to applying samples to the panels. The tape is to be applied to the panel with a mechanically operated roller weighing 10 pounds-mass (4.53 kg). The roller is to pass each sample five times in each direction. Using a cutting gig or razor blade, the rolled portion of the sample is to be trimmed to a 1 inch by 1 inch square on the panel, such that the remaining test sample measures 1 inch by 5 inches. The tape is to be allowed to dwell on the panel for the specified time. After dwelling, the clamp is to be placed on the free end of the sample, insuring that the damp extends completely across the width of the specimen and is aligned to uniformly distribute the load. The specified test load is then to be applied to the clamp gently so as not to cause any shear impact force on the sample. The load is to be applied for the specified test duration. The test panel is to be positioned at 2 degrees from the vertical so that the test substrate forms a 178° angle with the extended tape sample. Individual samples of the tape are to be tested in accordance with each of the conditions as set forth hereinbelow:

| Test No. | Application Condition | Dwell Time | Test Condition | Test Load | Duration |
| --- | --- | --- | --- | --- | --- |
| 2. | 40° F. (4.4° C.) dry substitute | 15 minutes | 40° F. | 5 lbs. (22.2 N) | 6 hours |
| 3. | 73.4° F. (23° C.) 50% RH | 15 minutes | 73.4° F. | 5 lbs | 6 hours |
| 4. | 73.4° F. (23° C.) 50% RH | 24 hours | 73.4° F. | 10 lbs | 120 hours |
| 5. | 73.4° F. (23° C.) 50% RH | 15 minutes | 150° F. 65.6° C. | 5 lbs | 6 hours |

The shear adhesion strength of the tape (in each of the above tests) shall be such that the tape is able to maintain the test loads specified in the tests for the indicated test durations without evidence of separation or slippage in excess of 1/32 inch (0.79 mm).

The aforementioned tests (peel adhesion and shear adhesion) constitute the essential criteria which are critical to achieve in order to provide an aluminum tape meeting UL specifications for use with air ducts and connectors. However, for the sake of accuracy, it is to be noted that they are not the only tests which must be passed to satisfy UL specifications. One such test is a tensile strength test for the tape backing (foil). Another is peel adhesion at 20° angle. The former is not relevant to this invention and the latter will be met if the adhesive passes the five critical tests enumerated above.

Other UL criteria, specifically surface burning characteristics, mold growth and humidity tests, temperature/pressure cycling tests, burning test and manufacturing and production tests, as detailed in UL181A, are not difficult to meet and for purposes of a clear understanding of the nature and objects of this invention need not be described.

U.S. Pat. Nos. 4,900,624 and a division thereof, 4,880,880 issued to the instant inventor, Samuel J. Chen relate to adhesive tapes meeting UL 181A requirements for such foil tapes.

As disclosed in the aforementioned patents, an adhesive formulation found operative in meetings these requirements will consist of the crosslinked copolymer:
(1) from about 5 to about 20 parts by weight of activated ester containing vinyl monomer of a specified formula;

(2) from about 3 to about 10 parts by weight of ethylenically unsaturated carboxylic acid containing 3-5 carbon atoms;

(3) from about 70 to about 85 parts by weight of acrylic or methacrylic acid ester of a non-tertiary alcohol having 1-14 carbon atoms; and (4) from about 7 to about 22 parts by weight of vinyl ester of a saturated carboxylic acid.

The aforementioned patents are said not to provide foil tapes which are necessarily better than those described and claimed in Applicant's then copending application Ser. No. 019,832 filed Feb. 28, 1987 (and now abandoned) directed to foil tapes meeting UL 181A specifications, but to utilize readily obtainable starting materials, as distinguished from the adhesives of Ser. No. 019,832. As disclosed in Ser. No. 019,832, the adhesive will comprise the crosslinked copolymer of:

(1) at least one macromolecular monomer of a specified formula of which only one species had been commercially available;

(2) at least one ethylenically unsaturated carboxylic acid containing 3-5 carbon atoms;

(3) at least one acrylic or methacrylic acid ester of a non-tertiary alcohol having 1-14 carbon atoms; and (4) at least one vinyl ester of a saturated carboxylic acid.

Applicant's U.S. Pat. Nos. 4,902,569 and a division thereof, 5,095,071 are directed to an improvement over the aforementioned earlier patents predicated upon the discovery that if the monomeric components are admixed in specified proportions in the presence of an acid catalyst, the adhesive meeting UL 181A requirements is obtained with substantial cost reduction and without the need of an additional crosslinking agent.

While all of the aforementioned adhesives meet UL 181A requirements and specifications, including shear adhesion (creep testing) at 40° F., 73.4° F. and 150° F., there is still a need in the art for tapes meeting these requirements over a more extended temperature range, particularly in the cold at 30° F. and lower, temperatures traditionally found in the winter.

Stated simply, the task of this invention is to provide improved tapes meeting UL 181A requirements and specifications and which maintain the required adhesive properties over a broader temperature range, notably in the cold.

BRIEF DESCRIPTION OF THE INVENTION

The present invention solves the aforementioned task in an elegant and novel manner by providing a pressure sensitive adhesive composition meeting the Underwriter Laboratories requirements and specifications as well as maintaining adhesive properties over a broad temperature range, the composition consisting essentially of the crosslinked copolymer of operative amounts of:

(1) ethylenically unsaturated carboxylic acid containing 3-6 carbon atoms within the range of 2-15 parts by weight of total polymer; and (2) acrylic and/or methacrylic acid ester of a non-tertiary alcohol having 1-14 carbon atoms within the range of 85-98 parts by weight of total polymer.

DETAILED DESCRIPTION OF THE INVENTION

The advantages of a broad temperature range high shear pressure sensitive adhesive composition are clearly evident when one considers that the invention's primary application, namely, installation of fiberglass air ducts occurs throughout the year and the materials used therefore are exposed to extreme cold and heat depending on the season and geographical location. Moreover, the exposure is not transient but prolonged in view of the given delays in construction as well as from preordering which lead to prolonged exposure to varying temperatures. Thus a broad temperature range adhesive composition is highly desirable.

As previously mentioned the novel tapes of this invention are foil tapes meeting UL 181A requirements and which contain an adhesive layer consisting essentially of the crosslinked copolymer of operative amounts of: (1) ethylenically unsaturated carboxylic acid containing 3-6 carbon atoms within the range of 2-15 parts by weight of total polymer; and (2) acrylic and/or methacrylic acid ester of a non-tertiary alcohol having 1-14 carbon atoms within the range of 85-98 parts by weight of total polymer.

As examples of useful ethylenically unsaturated carboxylic acids containing 3-6 carbon atoms, mention may be made of acrylic acid, methacrylic acid, itaconic acid, maleic acid and fumaric acid, acrylic acid being particularly preferred.

Useful acrylic or methacrylic acid esters of alcohols having 1-14 carbon atoms include those previously mentioned with reference to U.S. Pat. No. 4,554,324, i.e. methanol, ethanol, 1-propanol, 2-propanol, 1-butanol, 2-butanol, 1-pentanol, 2-pentanol, 3-pentanol, 2-methyl-1-butanol,1-methyl-1-pentanol,2-methyl-1-pentanol,3-methyl-1-pentanol,2-ethyl-1-butanol, 3,5,5-trimethyl-1-hexanol, 3-heptanol, 2-octanol, 1-decanol, 1-dodecanol as well as others. Preferred are a mixture of esters of non-tertiary alcohols having 4-14 carbon atoms, e.g. 2-ethylhexyl acrylate, butyl acrylate, amyl acrylate, decyl acrylate, lauryl acrylate, and the like, 2-ethylhexyl acrylate being particularly preferred; polymerized with an acrylic acid ester of an alcohol having 1-4 carbon atoms, i.e. methyl acrylate, ethyl acrylate, propyl acrylate and butyl acrylate; ethyl and butyl acrylate being particularly preferred.

In the foregoing description of the invention, reference was made to employing "operative amounts" of ethylenically unsaturated carboxylic acid and acrylic and/or methacrylic acid ester within the recited parts by weight of the total polymer.

As a general rule, acids and esters meeting the recited description, including the disclosed illustrative species, will meet UL 181A specifications if employed in the recited amounts by weight. However, applicant has observed exceptions to this general rule. For instance, a crosslinked terpolymers prepared containing 8 parts by weight and 10 parts by weight, respectively, of acrylic acid (well within the recited range of 2-15 parts by weight) were found not to meet UL 181A requirements in the particular formulation prepared. Likewise, crosslinked terpolymers containing 30 parts by weight of methyl acrylate and 35 parts by weight of ethyl acrylate, respectively, were also found not to meet UL 181A requirements.

Accordingly, the definition of the amounts by weight of the monomers to be employed is further modified by the recitation of "operative amounts" in addition to the recited ranges.

As used herein, "operative amounts" will be well understood to mean amounts of the monomers within the recited ranges, namely amounts of ethylenically unsaturated carboxylic acid containing 3-6 carbon atoms within the range of 2-15 parts by weight of total polymer and amounts of acrylic and/or methacrylic acid ester of a non-tertiary alcohol having 1-14 carbon atoms within the range of 85-98 parts by weight of total polymer, which in the crosslinked polymer will meet UL 181A requirements and specifications for use with rigid fiberglass air ducts.

The selection of "operative amounts" by the practitioner of this invention will involve only routine experimentation within the expected judgment of the skilled worker in the light of this disclosure.

The UL 181A requirements and how to test for them are fully set forth in the BACKGROUND OF THE INVENTION. As a guideline for a quick determination, one should first run the peel adhesion test (Test No. 1 requiring peel adhesion strength of at least 60 ounces/inch) and the shear adhesion tests 4 and 5 for shear adhesion long term at room temperature and high temperature shear adhesion respectively.

The crosslinking agents to be employed, namely crosslinkers reactive with the carboxylic acid moiety through their reactive hydrogen atom, are per se known in the art and their selection will be within the expected judgment of the skilled worker in the light of the present disclosure.

Such per se known crosslinkers include aluminum acetylacetonate and the alkylated amino crosslinkers of the "CYMEL" or "BEETLE" (Trademarks of American Cyanamide Co.) Series, highly alkylated melamines such as "CYMEL" 303 (understood to be hexamethoxymethyl melamine)being a particularly efficient one. In general, organometallic crosslinkers are preferred; aluminum or titanium being most preferred.

However, as will be readily appreciated by those skilled in the art, the particular crosslinking agent selected should not of course be one that crosslinks so rapidly that it increases the viscosity of the reaction mixture to such a degree so that it cannot be coated on the foil backing to provide the contemplated foil tape. As is well understood, the rapidity of crosslinking to increase viscosity of the mixture is in part a function of the effectiveness of the crosslinker itself and in part a function of the concentration of the crosslinker in the reaction mixture.

An important aspect of the present invention is the discovery that crosslinking in the described manner markedly increase the shear adhesion with a lighter "trade" drop-off in peel adhesion. Accordingly, the non-crosslinked polymer should have sufficient initial adhesion to allow for a slight drop-off and still possess sufficient peel adhesion to meet UL specifications. Since the peel adhesion criteria is not as difficult to achieve as the shear adhesion, particularly shear adhesion meeting high temperature and long term criteria, this is not a significant problem in the selection of the monomers for copolymerization.

Nevertheless, because of this light drop-off and further in view of varying efficiencies of selected crosslinking agents, it is not possible to state quantitatively the weight ratio of crosslinker which should be employed in the practice of this invention.

Functionally, it can be stated and will be understood that sufficient crosslinker should be employed to increase the shear adhesion to acceptable levels while at the same time not lowering the peel adhesion from initially acceptable levels to levels which are no longer acceptable.

By way of illustration, when employing aluminum acetylacetonate or "CYMEL" 303, levels on the order of 0.1 to 1.0 parts per 100 parts by weight of polymer are entirely acceptable.

The polymer of this invention may be prepared by routine chemical synthesis within the expected judgment of those skilled in the art. Specifically, the monomeric components may be admixed and polymerization effected in the presence of the usual polymerization initiators, chain extenders, etc. The resulting polymer (which may be regarded as an intermediate in the synthesis of the ultimate crosslinked copolymers) may then be admixed with a crosslinker for the carboxylic acid monomeric component, as heretofore discussed, to provide the desired polymeric adhesive. Sufficient crosslinking will occur during manufacture, e.g. solvent removal, to make the adhesive operative for meeting UL specifications. However, it has been determined that further crosslinking will occur over a period of time, particularly during shelf life at elevated temperatures.

The following examples show by way of illustration and not by was of limitation the practice of this invention.

Example 1

A glass reactor was charged with the following monomer solution:

0.75 parts by total weight Acrylic Acid (AA)

3.75 parts by total weight Ethyl Acrylate (EA)

8.00 parts by total weight 2 Ethylhexyl Acrylate (2-EHA)

16.00 parts by total weight Ethyl Acetate (solvent)

Thereafter the reactor was purged with nitrogen and heated to 77°-78° C. at which point the following ingredients were added.

0.075 parts by total weight Lupersol PMS (Trademark of Elf Atochem for tertiary butyl peroxy-2-ethyl-hexanoate, a polymerization initiator.)

0.5 parts by total weight Ethyl Acetate

After the exotherm, the solution was held for one hour before a catalyst solution was added. Co-feeding of the monomer solution began five minutes after the catalyst solution was added, for approximately 105 minutes at a temperature between 78°-83° C. The composition of the monomer and catalyst feed solutions were as follows:

Monomer Solution:

2.25 parts by total weight Acrylic Acid 11.25 parts by total weight Ethyl Acrylate 24.0 parts by total weight 2-Ethylhexyl Acrylate 22.4 parts by total weight Ethyl Acetate Catalyst Solution:

0.07 parts by total weight azobisisobutyronitrile (AIBN)

5.65 Ethyl Acetate

After the aforementioned co-feeding was completed, the feed tanks were rinsed with 4.0 parts by total weight of ethyl acetate and the mixture was held at 78° C. for 1 hour.

Thereafter the following catalyst chaser solution was added:

0.005 parts by total weight AIBN 1.3 parts by total weight Ethyl Acetate

The resultant mixture was held at 78° C. for 2 hours and cooled to 45°.

The resultant polymer was crosslinked by adding the following solution:

0.25 parts by weight Aluminum Acetylacetonate (AAA) dissolved in 2.4 parts by weight Toluene
23.0 parts by weight Isopropyl Alcohol (99% active)

The resultant mixture was stirred for one hour at 40° C. and the polymer cooled once crosslinked. The resultant polymer consisted of (measured in parts by weight): 64 2-EHA/30 EA/6 AA.

In the following Examples, the process as described above in the Example 1 was repeated varying the monomers employed.

| Example | Parts by Total Weight |
|---|---|
| 2 | 68 2-EHA/25 EA/7 AA |
| 3 | 69 2-EHA/25 EA/6 AA |
| 4 | 62 2-EHA/30 BA*/8 AA |
| 5 | 67 2-EHA/25 BA*/8 AA |
| 6 | 79 2-EHA/15 MA/6 AA |
| 7 | 74 2-EHA/20 MA/6 AA |
| 8 | 63 2-EHA/30 EA/7 AA |

*BA = Butyl Acrylate

Aluminum foil tapes were prepared from each of the adhesive polymers described in Examples 1–8 by casting the adhesive onto the backing material at a thickness on the order of 2 mils.

Each of the resulting foil tapes was submitted to Underwriter Laboratories Testing, specifically solution viscosity, probe tack, peel adhesion 150° F. and 30° F. (the latter exceeding UL 181 requirements in the cold by 10° F.) adhesion, each as previously described in detail in the BACKGROUND OF THE INVENTION.

Additionally, as controls Examples 9 and 10 were prepared in the manner described above along with Example 11 prepared in the manner described in the aforementioned U.S. Pat. No. 4,880,880.

Example 9

60 EHA/ 15 BA/10 AA/15 VA

Example 10

70 EHA/15 BA/10 AA/5 VA

Example 11

76 EHA/2 MAGME*/12 AA/11 VA**

*MAGME=Methyl Acrylamidoglycolate Methyl Ether
**VA=Vinyl Acetate value of 1 or less. In addition, Example 1 was subjected to creep testing at 20° F. and 250° F. and passed UL 181A specifications and requirements at these extreme temperatures, thus illustrating the ability of the present invention to provide a significantly broader temperature range in both the hot and the cold.

As was mentioned earlier, not all monomers which may be employed in the practice of this invention will provide polymers meeting UL 181A specifications and requirements, even if present in a given reaction mixture within the recited ranges of parts by weight of total polymer.

Accordingly, as a further limitation, it is necessary that these monomers be present in the polymer in "operative amounts" as that term is used here and in the appended claims.

The following examples, illustrate the need for operative amounts in polymers prepared in the foregoing manner.

| Example | Parts by Total Weight |
|---|---|
| 12 | 65 2-EHA/30 MA/5 AA |
| 13 | 67 2-EHA/25 EA/8 AA |
| 14 | 60 2-EHA/35 EA/5 AA |
| 15 | 65 2-EHA/25 BA/10 AA |

The following table sets forth the test results for these additional tests.

TABLE 2

| Test | 12 | 13 | 14 | 15 |
|---|---|---|---|---|
| Probe Track | 607 | 562 | 586 | 313 |
| Peel Adhesion (oz/in) | 53.5 (Fail) | 64 | 46 (Fail) | 52 (Fail) |
| shear at 150° F. (hrs.) | | | | |
| Shear at Room Temp. (hrs.) | 100+ | 100+ | 100+ | 6.5 |
| Shear at Room Temp. (hrs.) | 120+ | <72 (Fail) | — | — |

As seen, in each of Examples 12–15, the test polymer failed to meet one of the UL 181A requirements. Once failure was noted, the remaining tests were not run, thus explaining the blanks.

With respect to Example 12, it will be seen that the polymer with 30 parts by weight of methyl acrylate failed, while polymers with 15 parts by weight (Example 6) and 20 parts by weight (Example 7) passed.

TABLE 1

| Test | 1 | 2 | 3 | 4 | 5 | 6 | 7 | 8 | 9 | 10 | 11 |
|---|---|---|---|---|---|---|---|---|---|---|---|
| Probe Tack | 487 | 512 | 572 | 568 | 520 | 579 | 545 | 578 | 323 | 384 | 26 |
| Peel Adhesion (oz/in) | 66 | 63 | 58–60 | 66 | 64 | 61.2 | 63.4 | 68 | 74 | 68.6 | 84 |
| Shear at 150° F. (hrs) | 100+ | 87 | 9.5 | 8 | 6.4 | 100+ | 100+ | 100+ | 100+ | 100+ | 100+ |
| Shear at Room Temp. (hrs.) | 120+ | 140+ | 120+ | 120+ | 120 | 120+ | 120+ | 120+ | 120+ | 120+ | 120+ |
| Adhesion to Fiberglass Duct Board at 30° F. | 5 | 5 | 5 | 4 | 5 | 5 | 5 | 4 | 1 | 1 | 0 |

The above data illustrates the improvement over the controls (Examples 9–11) by showing adhesive properties at a temperature of 30° F. More specifically, the present invention showed adhesion values of 4 to 5+ at 30° F. as opposed to the prior tapes which showed a While Example 13 with 8 parts by weight of acrylic acid failed, Examples 1,2,3 and 8 with 6,7,6 and 7 parts by weight, respectively, of acrylic acid all passed.

With respect to Example 14 which failed with 35 parts by weight of ethyl acrylate, it will be seen that Examples 1,2,3 and 7 all passed with 30,25,25 and 30 parts by weight, respectively, of ethyl acrylate.

Finally, while Example 15 failed with 10 parts by weight of acrylic acid, Examples 4 and 5, each with 8 parts by weight of acrylic acid, both passed.

From the foregoing description and the illustrative examples it will thus be seen that employing the unsaturated carboxylic acid and/or the ester in the recited parts by weight offers a predictability of success in meeting UL 181A requirements. Yet this cannot be ascertained unequivocally without running the necessary routine tests as explained in detail in the foregoing description.

In any event, the guidelines and criteria for meeting these requirements are fully described so as to enable one skilled in the art by routine experimentation and without the exercise of mental gymnastics or without the requirement for the exercise of inventive faculties easily to practice the present invention.

Since certain changes may be made without departing from the scope of the invention herein described, it is intended that all matter contained in the foregoing description, including the examples, shall be taken as illustrative and not in a limiting sense.

What is claimed is:

1. A metal foil tape meeting Underwriter Laboratories criteria for use with fiberglass air ducts comprising a metal foil backing sheet carrying on one surface thereof a layer of an adhesive composition consisting essentially of the crosslinked copolymer having operative amounts of:
   1) ethylenically unsaturated carboxylic acid containing 3–6 carbon atoms within the range of 2–15 parts by weight of total polymer; and
   (2) acrylic and/or methacrylic acid ester of a non-tertiary alcohol having 1–14 carbon atoms within the range of 85–98 parts by weight of total polymer.

2. A foil tape as defined in claim 1 wherein the ethylenically unsaturated carboxylic acid is acrylic acid.

3. A foil tape as defined in claim 1 wherein the ester comprises a mixture of 2-ethylhexyl acrylate and ethyl acrylate.

4. A foil tape as defined in claim 1 wherein the ester comprises a mixture of 2-ethylhexyl acrylate and butyl acrylate.

* * * * *